United States Patent

Abramov et al.

[11] 3,709,270
[45] Jan. 9, 1973

[54] DEVICE FOR MANUFACTURING TUBULAR PRODUCTS

[75] Inventors: Viktor Petrovich Abramov; Yan Petrovich Junga; Gunard Valdemarovich Berzin; Voldemar Petrovich Skrupsky, all of Riga; Petr Nikoleavich Frolov, Moscow; Andrei Lukyanovich Lugovskoi; Felix, Alexandrovich Shilgorin, both of Odessa; Yan Yanovich Dalbinsh, Riga; Karl Arturovich Rotsen, Riga; Andris Eduardovich Ziemelis, Riga; Artur Elksnis, Riga; Bruno et al. Priede, Jurmala, all of U.S.S.R.

[73] Assignee: Institut Khimii Drevesiny Akademii Nauk Latviiskoi SSR, Riga, U.S.S.R.

[22] Filed: Oct. 9, 1970

[21] Appl. No.: 79,497

[52] U.S. Cl. .................................................. 144/268

[51] Int. Cl. ........................................... B27h 5/00
[58] Field of Search .................................... 144/268

[56] References Cited

UNITED STATES PATENTS

| 77,036 | 4/1868 | Hale | 144/268 |
| 341,866 | 5/1886 | Allgire | 144/268 |
| 2,392,194 | 1/1946 | Seymour | 144/268 |

Primary Examiner—Donald R. Schran
Attorney—Holman & Stern

[57] ABSTRACT

A device for manufacturing tubular products from wooden battens by winding the battens on a rotating core with the aid of an endless driving band which presses the batten against the core, and a system of circular elements for ensuring continuous feed and compaction of the battens.

1 Claim, 3 Drawing Figures

DEVICE FOR MANUFACTURING TUBULAR PRODUCTS

BACKGROUND OF THE INVENTION

The present invention relates to the manufacture of products from plasticized wood and more specifically to devices for manufacturing tubular products from wooden battens.

Widely known in the art is the method of manufacturing tubular products from plasticized wooden battens by winding battens on a rotating core clamped in a turning lathe or some other machine specially adapted for the purpose. The batten is wound on the core with the aid of a metal bank, one end of which is secured to the core. The batten is inserted between with the core and the band. The free ends of the batten and the band being inserted into a carriage which moves the components along the core and tensions the band and the batten which is required for compacting the batten.

These devices have a low output since they operate on an intermittent principle and require stopping the device each time after winding one batten and before inserting the next batten.

An object of the invention is to eliminate the disadvantages of the known devices.

The main object of the invention consists in providing a device ensuring a continuous feed of the battens onto the core.

SUMMARY OF THE INVENTION

This object is accomplished by providing a device for manufacturing tubular products from wooden battens by winding the battens on a rotating core with the aid of a band pressing the batten against the core in which, according to the invention, the band is of an endless driving type moving in synchronism with rotation of the core and installed so that it fits around the core and in which there is a system consisting of at least two circular elements embracing the core one after another, with the first circular element relative to the start-of-winding point being set stationary with respect to the core and having a helical rear face surface serving as a guide for the batten being wound on the core while the second or last circular element is installed so as to be able to rotate in synchronism with the core and the band, and being provided with an internal tapered surface which narrows towards the outlet end with a clearance sufficient for the passage of the wound tubular product, and the second circular elements constituting, together with the core, a working capacitor.

Such a design ensures a continuous operating process in which a continuity is ensured by merely positioning each next batten on the helical surface of the first circular element.

Now the invention will be described in detail by way of example with reference to the accompanying drawings, in which:

DETAILED DESCRIPTION OF THE INVENTION

Figure 1:
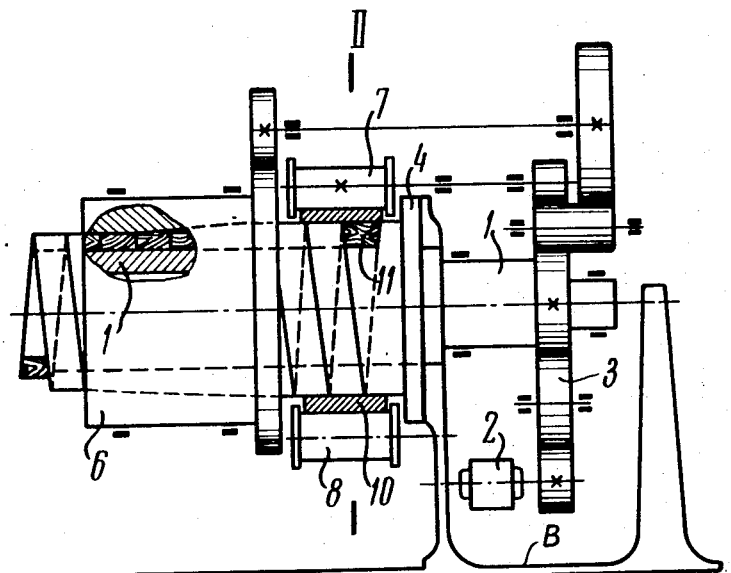
FIG. 1 is a general schematic view partly in elevation and partly in cross-section of the device for manufacturing tubular products from wooden battens according to the invention.

The device comprises a hollow core 1 (FIG. 1) installed on a bed B, (illustrated diagrammatically in the drawing) and rotated by an electric motor 2 via a transmission train 3.

Figure 3:
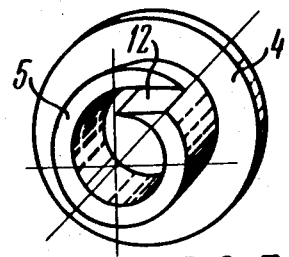
FIG. 3 is a view in perspective of a circular element with a helical face surface.

Fitting around the core are two circular elements 4 and 6 arranged one after the other in an axial direction. The front circular element 4 (FIG. 3) is rigidly fixed on the bed at the start-of-winding point and is provided with a helical face surface 5. The pitch of the helical surface is approximately equal to the width of the wound batten which makes it possible to wind the coils tightly to one another.

The second circular element 6 (FIG. 1) is installed after the element 4 and is also mounted on the bed but it can rotate in synchronism with the core 1. The element 6 is rotated by the electric motor 2 via the transmission train 3.

The internal surface of the element 6 is tapered and narrows towards the outlet end. The clearance between the element 6 and the core 1 is sufficient for the passage of the wound product.

An endless driving band 10 tensioned on pulleys 7, 8 and 9 (FIG. 1, 2) at the point of location of the circular element 4 passes around the element 4 and core 1 and presses a batten 11 against the core 1. The band 10 is driven by a pulley 9 which is linked kinematically with the transmission train 3. The transmission train is so designed as to drive the band 10 and rotate the core 1 and the circular element 6 in synchronism.

Figure 2:
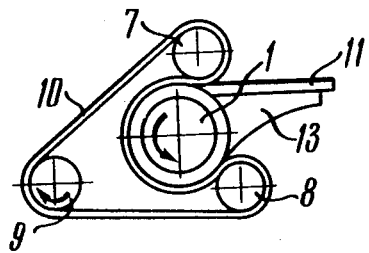
FIG. 2 is a view taken along line II—II in FIG. 1.

The batten used for winding must be plasticized. And this can be done by an ammonia treatment, by steaming or by another method. One end of the plasticized batten 11 (FIGS. 1,2) is positioned on a flat surface 12 (FIG. 3) of the element 4.

During rotation of the core 1 and element 6 and during movement of the band 10, the band presses the batten 11 against the core 1.

A support 13 (FIG. 2) adjoining the flat surface 12 ensures a continuous contact between the batten and the core 1. Due to the helical shape of the face surface 5 of the element 4, the coils of the batten 11 are continuously displaced along the core 1. A tight closing of the coils to each other is ensured since the pitch of the helical face surface 5 is equal to the width of the batten being wound. In addition, the helical face surface also compresses the coils. In order to fix the shape of the product more efficiently, there is a field of high frequency current induced between the core 1 and the circular element 6, with this field drying the tubular products.

For feeding the high frequency currents, the core 1 is hollow and accommodates an electric conductor. Whereby the core 1 and the element 6 constitute a working capacitance, including the tubular product of wood therebetween. A suitable power source having a frequency suitable for causing sufficient current in the tubular product is connected between the core 1 and the circular element 6. The details of such drying caused by circulating high frequency currents would be readily apparent to those skilled in the art.

The internal tapered surface of the element 6 consists of two sections with different degrees of taper. The front section with relation to the start-of-winding point has a larger angle of taper while the rear section has a smaller angle of taper. This is required due to the nature of wood shrinkage. The tapered surface of the element 6 is calculated so that after shrinkage, the batten is still pressed upon by the tapered surface.

The battens can be fed onto the circular element 4 continuously.

We claim:

1. A device for manufacturing tubular products from wooden battens comprising: a bed; a core rotatably installed on said bed; a first circular element fitting around said core and fixedly mounted on said bed with relation to said core, said first circular element having a helical face surface serving as a guide for the battens being wound on said core; an endless driving band mounted on the bed, said band fitting partly around said first circular element and pressing said battens against said core; a second circular element fitting around said core in spaced axial relationship to the first circular element, said second circular element being mounted on said bed for rotation in synchronism with said core and said endless band; and said second circular element having an outlet end, the second circular element having an internal tapered surface which narrows towards said outlet end to provide a clearance sufficient for the passage of the product wound on said core, the device including means for drying the formed tubular product.

* * * * *